United States Patent [19]

Adamic et al.

[11] Patent Number: 5,188,664
[45] Date of Patent: Feb. 23, 1993

[54] ANTI-COALESCENT INK COMPOSITION AND METHOD FOR MAKING THE SAME

[75] Inventors: Raymond J. Adamic; Theresa A. Gibney, both of Corvallis, Oreg.

[73] Assignee: Hewlett-Packard Company, Palo Alto, Calif.

[21] Appl. No.: 798,463

[22] Filed: Nov. 26, 1991

[51] Int. Cl.$^5$ .............................................. C07D 11/02
[52] U.S. Cl. ................................. 106/22 R; 106/20 D
[58] Field of Search ..................................... 106/20, 22

[56] References Cited

U.S. PATENT DOCUMENTS

| | | | |
|---|---|---|---|
| 4,409,040 | 10/1983 | Tabayashi et al. | 106/20 |
| 4,500,895 | 2/1985 | Buck et al. | 346/140 R |
| 4,513,298 | 4/1985 | Scheu | 346/140 R |
| 4,685,968 | 8/1987 | Palmer | 106/22 |
| 4,794,409 | 12/1988 | Cowger et al. | 346/140 R |
| 4,822,417 | 4/1989 | Kobayashi et al. | 106/23 |
| 4,923,515 | 5/1990 | Koike et al. | 106/20 |
| 4,963,189 | 10/1990 | Hindagolla | 106/22 |
| 5,049,188 | 9/1991 | Takimoto et al. | 106/22 |
| 5,059,246 | 10/1991 | Yamamoto et al. | 106/22 |
| 5,082,496 | 1/1992 | Yamamoto et al. | 106/22 |
| 5,100,469 | 3/1992 | Pontes et al. | 106/22 |
| 5,141,556 | 8/1992 | Matrick | 106/22 |
| 5,141,558 | 8/1992 | Shirota et al. | 106/20 |

OTHER PUBLICATIONS

*Hewlett-Packard Journal*, vol. 39, No. 4 (Aug. 1988).
*Hewlett-Packard Journal*, vol. 36, No. 5 (May 1985).
*The Flexible Polyurethane Foam Handbook*, Dow Chemical USA, Midland, Mich.

*Primary Examiner*—Mark L. Bell
*Assistant Examiner*—Helene Klemanski

[57] ABSTRACT

An improved ink composition having an additive therein for reducing the surface tension of the composition and increasing the drip mass per firing. Reduced surface tension and increased drop mass per firing enable the production of graphic images having enhanced clarity and contrast while avoiding problems such as bubble adhesion/longevity and ink mottling/coalescence. The additive basically consists of at least one polyether polyol. The additive is usable in a wide variety of ink compositions. In a preferred embodiment, ink compositions using the additive will include about 0.001-1.0% by weight additive (0.0075% = optimum). The resulting ink formulations are capable of printing high resolution graphic images while avoiding the problems described above.

17 Claims, No Drawings

ANTI-COALESCENT INK COMPOSITION AND METHOD FOR MAKING THE SAME

BACKGROUND OF THE INVENTION

The present invention generally relates to printing technology, and more specifically to the production and use of ink compositions having chemical additives therein which substantially improve print quality.

Significant developments have been made in the field of electronic printing technology. Specifically, a wide variety of highly efficient printing systems currently exist which are capable of dispensing ink in a rapid and accurate manner. Thermal inkjet systems are especially useful for this purpose. Thermal inkjet printing cartridges basically include an ink reservoir in fluid communication with a substrate having a plurality of resistors thereon. Selective activation of the resistors causes thermal excitation of the ink and expulsion thereof from the ink cartridge. Representative thermal inkjet systems are discussed in U.S. Pat. No. 4,500,895 to Buck et al.; U.S. Pat. No. 4,513,298 to Scheu; U.S. Pat. No. 4,794,409 to Cowger, et al.; the *Hewlett-Packard Journal*, Vol. 36, No. 5 (May 1985); and the *Hewlett-Packard Journal*, Vol. 39, No. 4 (August 1988), all of which are incorporated herein reference.

Notwithstanding the existence of advanced printing systems, additional research has also been conducted in order to produce new and effective ink products to be used in these systems. Unless ink compositions are properly formulated, problems can occur with respect to ink delivery and image quality. These problems are especially acute in cartridge systems which do not include a foam or sponge-type reservoir system for holding ink therein. For example, it is important for ink products to be specially formulated so that the surface tension levels thereof are not excessively high. Ink compositions having excessively high surface tension levels (e.g. +60 dynes/cm) often produce graphics having a low degree of quality and resolution. In addition, applied ink compositions having high surface tension values may mottle or coalesce on the paper or other print media being used, thereby causing blotchy images. Ink compositions having high surface tension values frequently promote bubble adhesion/longevity within the firing chambers of thermal inkjet cartridges and other printing systems. Bubble adhesion/longevity involves the formation of bubbles in the ink which do not dissipate or dissipate at a slow rate. This problem again results in impaired cartridge operation.

In an attempt to control the above problems, surfactants have been added to the ink compositions. Exemplary surfactant materials suitable for this purpose include polyethylene glycol; N,N-Dimethyldodecyl amine-N-oxide; 3-(N,N-Dimethylpalmityl-ammonio)-propanesulfonate, and a commercially available product from the Air Products Company of Philadelphia, Pa. sold under the trademark Surfynol 465 which has the following structure:

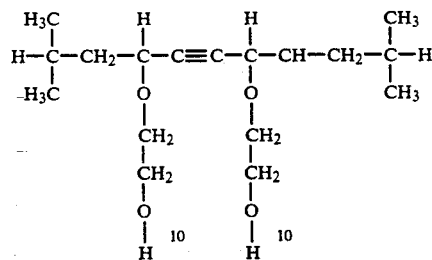

While surfactants decrease the surface tension of ink compositions, they do not necessarily control other problems which may occur during application of the compositions. For example, lowering the ink surface tension generally has no predictable effect on steady state ink drop mass per firing. The phrase "ink drop mass per firing" as used herein basically involves the amount of ink ejected from a nozzle in an ink cartridge during one firing thereof, and is a function of many variables. These variables include but are not limited to the geometry of the firing chamber in the cartridge, the resistor design used in the cartridge, the cartridge input energy, the designated firing frequency, and the physio-chemical properties of the ink materials (e.g. ink wettability).

Decreasing the surface tension of ink compositions does not necessarily effect drop mass per firing because the other factors indicated above may play a more significant role. Ink compositions with a low drop mass per firing are delivered to print media in an insufficient quantity, resulting in low contrast images. This occurs because the amounts of chemical dyes and other important materials in these compositions are insufficient to cover the desired areas of the print media to produce clear, dark images.

Accordingly, a need remains for an ink composition which is specifically formulated to have a low surface tension level while maintaining a high level of ink drop mass per firing. The ink composition should also be suitable for use in a wide variety of printing systems, including thermal inkjet units. The present invention satisfies these needs in a unique and effective manner, as described herein below.

SUMMARY OF THE INVENTION

It is an object of the present invention to provide an improved ink composition and method for making the same.

It is another object of the invention to provide an improved ink composition which has a reduced surface tension in order to prevent ink coalescence/mottling on print media.

It is a further object of the invention to provide an improved ink composition which has a high drop mass per firing so that a proper amount of ink will be delivered during printing.

It is a further object of the invention to provide an improved ink composition which is formulated to avoid excessive bubble adhesion/longevity within printing cartridge systems.

It is a still further object of the invention to provide an improved ink composition which uses a minimal number of chemical components.

It is a still further object of the invention to provide an improved ink composition which is easily formulated using readily available chemical components.

It is an even further object of the invention to provide an improved ink composition which is readily dispensed using a wide variety of printing systems.

It is an even further object of the invention to provide an efficient method for printing using the ink composition described herein.

In accordance with the foregoing objects, the present invention involves an improved ink composition and methods for making/using the same. The ink composition and methods described herein are highly effective in producing clear and stable printed images while avoiding coalescence/mottling. The composition basically consists of one or more selected dye materials in combination with other ingredients including but not limited to solvents, buffers, biocides, kogation-reducing agents, metal chelating agents, and the like. As indicated above, ink compositions having excessively high surface tension levels and a low drop mass per firing frequently cause numerous problems. In order to reduce the surface tension and increase the drop mass per firing of the ink compositions, a surface tension reducing agent having a structure capable of accomplishing these goals is added to the ink compositions. This agent consists of a polyether polyol composition described in greater detail below.

The selected polyether polyol is preferably added to each ink composition so that the composition contains about 0.001–1.0% by weight polyether polyol (about 0.0075% by weight = optimum). This relatively small amount of polyether polyol simultaneously performs a variety of important functions in the completed ink composition. First, it reduces the surface tension of the ink composition. Second, it increases the drop mass per firing of the ink composition. Third, by decreasing the surface tension of the ink composition, ink bubble adhesion/longevity within printing cartridges (e.g. thermal inkjet units) is substantially reduced or eliminated. All of these items result in improved print quality without physical modification of the ink cartridges or printing units. Accordingly, the present invention represents a significant advance in the art of printing technology/ink formulation and satisfies a long-felt need for efficient and versatile ink compositions.

These and other objects, features, and advantages of the invention will be described below in the following Detailed Description of Preferred Embodiments.

DETAILED DESCRIPTION OF PREFERRED EMBODIMENTS

The present invention involves a specially-formulated ink composition which avoids print quality problems associated with high surface tension (e.g. ink mottling/coalescence), low drop mass per firing, and excessive bubble adhesion/longevity within the firing chambers of thermal inkjet cartridges and the like. The composition is unique and may be used in a wide variety of printing systems including those which do not include foam-based ink reservoirs.

In order to produce an ink composition in accordance with the invention, one or more dyes are first selected. Exemplary dye materials (as well as other ink components) are described in co-owned U.S. Pat. No. 4,963,189 to Hindagolla which is incorporated herein by reference. It should be noted that the dye materials and other chemical agents listed herein and in the foregoing issued U.S. Patent are for example purposes only. Thus, the present invention shall not be limited to the ink components described below, and is prospectively applicable to a wide variety of the other ink compositions known in the art.

Dye materials suitable for use in the present invention as described in U.S. Pat. No. 4,963,189 have the following basic structure:

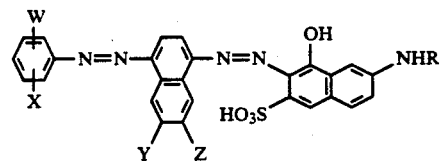

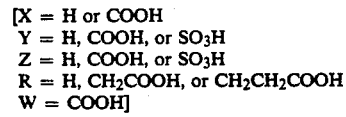

In this structure, there should be at least two COOH groups (2–4 = preferred), with the number of COOH groups being equal to or greater than the number of $SO_3H$ groups. It is also preferred that at least two of the COOH groups be attached directly to an aromatic carbon atom.

In a dye molecule wherein $X = H$, $W$ may be in the ortho, meta, or para position with respect to the azo ($-N=N-$) group, with $W$ preferably being in the para position. However, it is preferable that $X = COOH$, and that a dye molecule incorporating two COOH groups have such groups in the 3,5-, 3,4-, or 2,5-, position relative to the azo group.

It is also preferred that dye molecules having the above basic structure do not include more than two $SO_3H$ groups, and that the ultimate number of COOH groups in the dye molecule exceed the number of $SO_3H$ groups. Specific and exemplary dye structures are provided in Table I below:

TABLE I

| Dye # | X | W | Y | Z | R |
|---|---|---|---|---|---|
| 1 | 3-COOH | 5-COOH | H | H | H |
| 2 | 3-COOH | 5-COOH | COOH | H | H |
| 3 | 3-COOH | 5-COOH | H | COOH | H |
| 4 | 3-COOH | 5-COOH | H | $SO_3H$ | H |
| 5 | 3-COOH | 5-COOH | $SO_3H$ | H | H |
| 6 | H | 4-COOH | H | COOH | H |
| 7 | 3-COOH | 4-COOH | H | H | $CH_2COOH$ |
| 8 | 2-COOH | 5-COOH | H | $SO_3H$ | $CH_2COOH$ |
| 9 | 3-COOH | 5-COOH | $SO_3H$ | H | $CH_2COOH$ |
| 10 | 3-COOH | 5-COOH | H | H | $CH_2CH_2COOH$ |
| 11 | 3-COOH | 5-COOH | H | COOH | $CH_2COOH$ |

In a preferred embodiment, the ink compositions of the present invention should comprise about 0.5–20% (optimum range = about 1–10%) by weight dye (whether one dye or a combination of dyes is used). It is also desirable to use at least two different dyes to form the ink compositions described herein. The use of multiple dyes offers numerous benefits, including (1) the reduction of cartridge nozzle clogging; (2) the reduction of cartridge "bearding" (i.e. ink crystallization); (3) greater pH flexibility; (4) greater control of ink hue; and (5) the reduction of ink "bronzing" (i.e. reddish-brown discolorization). When multiple dyes are used, the ratio of dyes to each other may be in any proportion. However, if multiple dye mixtures are used, each dye included therein should not comprise less than 10% by weight of the total dye mixture.

The dyes described above are preferably used in salt form. Exemplary dye salts may consist of alkali metal salts (e.g. $Na^+$, $K^+$ or $Li^+$ salts), ammonium salts, or substituted ammonium salts. These salts are formed by mixing a dye in acid form with a stoichiometric amount of a selected base in water.

In order to prepare the completed ink compositions, a suitable solvent must be used in combination with the selected dye materials. In a preferred embodiment, the completed ink compositions should include about 2–30% by weight water-soluble organic solvent. Exemplary water-soluble organic solvents suitable for this purpose include but are not limited to $C_1$–$C_4$ aliphatic alcohols (e.g. methanol, ethanol, n-propanol, isopropanol, n-butanol, sec-butanol, tert-butanol, or isobutanol), amides (e.g. formamide or dimethylacetamide), ketones/ketone alcohols (e.g. acetone or diacetone alcohol), ethers (e.g. tetrahydrofuran or dioxane), nitrogen-containing heterocyclic ketones (2-pyrrolidone, N-methylpyrrolid-2-one, or 1,3 dimethylimidazolid-2-one), polyalkylene glycols (e.g. polyethylene glycol or polypropylene glycol), alkylene glycols and thioglycols containing $C_2$–$C_6$ alkylene groups (e.g. ethylene glycol, propylene glycol, butylene glycol, triethylene glycol, thiodiglycol, hexylene glycol, and diethylene glycol), glycerol, 1,2,6-hexanetriol, and lower alkyl ethers of polyhydric alcohols such as 2-methoxyethanol, 2-(2-methoxyethoxy)ethanol, 2-(2-ethoxyethoxy)ethanol, 2-methoxy-2-ethoxy-2-ethoxyethanol, 2-[2-(2-methoxyethoxy)ethoxy]ethanol, 2-[2-(2-ethoxyethoxy)ethoxy]ethanol.

In the foregoing group of solvents, preferred materials include glycols and glycol ethers (e.g. ethylene glycol, diethylene glycol, triethylene glycol, or 2-methoxy-2-ethoxy-2-ethoxyethanol), polyethylene glycols with molecular weights of up to 500, and heterocyclio ketones (e.g. 2-pyrrolidone, N-methylpyrrolid-2-one or 1,3-dimethylimidazolid-2-one). Preferred solvent mixtures includes a binary mixture of water and diethylene glycol or a binary mixture of water and 2-pyrrolidone.

It may also be desirable to add one or more buffers to the ink compositions so that a pH operating range of about 7–9.5 is maintained. Higher pH levels normally reduce ink clogging in cartridges and ink bronzing. In a preferred embodiment, the ink composition will include about 0.1–5.0% by weight buffer solution. Exemplary buffers should have a pK of about 6.5–10 and may include but are not limited to TES (N-tris[hydroxymethyl]methyl-2-aminoethanesulfonic acid), BICINE (N,N-bis[2-hydroxyethyl]glycine), TEA (triethanolamine), TRIS (tris[hydroxymethyl]aminomethane), BORAX (sodium borate decahydrate), and combinations thereof.

Biocides may also be optionally used in the ink compositions described herein in order to control microbial growth. In a preferred embodiment, the completed ink compositions will include about 0.1–0.5% by weight biocide. Exemplary biocides suitable for this purpose would include products sold under the names PROXEL TM GXL and PROXEL TM CRL by Imperial Chemical Industries of Manchester, England. These materials include 1,2-benzisothiazolin-3-one as the key active ingredient in combination with dipropylene glycol.

In addition, a selected optional phosphate may be added to the ink in order to control problems associated with "kogation". Kogation involves the build-up of residue known as "koga" on the resistors of thermal inkjet printing systems after the repeated operation thereof. This residue impairs printer operation. Both monobasic ($H_2PO_4^-$) and dibasic ($HPO_4^{-2}$) phosphate materials may be used. A variety of different cations may be associated with the phosphate, including but not limited to ammonium. In a preferred embodiment, the phosphate concentration in the completed ink composition would range from about 0.005–0.5% by weight (about 0.07% = optimum).

Finally, an optional metal chelating agent may be added to the completed ink composition. The chelating agent is designed to control or eliminate the formation of undesired precipitates within ink cartridges. Tests have shown that inks prepared using carboxyl dyes as described herein contain various metal ions, including calcium, iron, and magnesium. Metal precipitates often form within the cartridge, thereby resulting in clogging of the cartridge, improper firing, and/or incorrect drop size. To control this problem, chelating agents are used in the ink composition which bind with extraneous metal ions and form metal complexes. As a result, the metal ions are unavailable to form precipitates within the cartridges. Exemplary chelating agents include but are not limited to ethylenediaminetetraacetic acid (EDTA), malonic acid, and salicylic acid. In a preferred embodiment where a chelating agent is used, the completed ink composition should contain about 0.01–0.5% by weight chelating agent (about 0.1% = optimum).

An example of a completed ink composition suitable for use in accordance with the present invention is as follows:

EXAMPLE 1

| Component | Wt. % |
|---|---|
| Dye structure #1 (Table 1) | 1.1 |
| Dye structure #4 (Table 1) | 1.1 |
| Solvent (2-pyrrolidone) | 7.5 |
| Buffer | |
| BORAX | 0.2 |
| TRIS | 0.2 |
| Phosphate anion (ammonium phosphate) | 0.07 |
| Chelating agent (EDTA) | 0.1 |
| Biocide (PROXEL TM GXL) | 0.3 |
| water | 89.43 |
| | 100.00 |

This ink composition has a pH of about 8.5, a viscosity of about 1.3 cps, a surface tension of about 65 dynes/cm, a conductivity of about 8 mS/cm, and an absorbance maximum at about 575 nm.

The ink compositions described herein generally have a relatively high surface tension (e.g. between about 60–70 dynes/cm). A high surface tension within the range described above offers certain advantages, including the promotion of a capillary interaction between the fluid ink materials and firing chamber surfaces of the selected ink cartridge. A high degree of capillary action leads to rapid and efficient ink refilling between subsequent firings in the cartridge chamber.

However, in many cases, a high surface tension can also present problems which greatly offset the foregoing advantages. For example, the use of ink compositions having high surface tension values may produce poorly-defined graphic images in which the ink is not evenly distributed over the print media (e.g. paper).

This type of situation is commonly known as ink "mottling" or "coalescence". High surface tension levels cause mottling or coalescence to occur because of interactions between the ink compositions and media surface which prevent the compositions from becoming evenly distributed thereon. This is especially true with respect to graphic images which include large regions of solid printed images.

A further problem caused by increased surface tension levels is the formation of small ink bubbles within the firing chamber of the selected ink cartridges. Such bubbles have a high degree of adhesion/longevity as defined above. This phenomenon impairs cartridge operation and degrades print quality. Lower surface tension levels minimize bubble adhesion/longevity.

As noted above, the reduction of ink surface tension levels has been accomplished using various surfactants including but not limited to those listed above. However, tests have shown that surfactants cannot successfully control another problem characteristic of ink compositions known as "low drop mass per firing". As indicated above, drop mass per firing (usually expressed in nanograms) is basically defined as the amount of ink ejected from a given firing chamber of a specific ink cartridge for a given amount of input energy at a particular frequency. Many variables control drop mass per firing, including but not limited to the specific ink composition involved, the type of printing system being used to deliver the ink, and the other factors listed above. In particular, surface tension and the ink wettability (e.g. the ability of ink to spread out on the surface of a substrate), have a substantial effect on drop mass per firing. Regarding the ink compositions described herein, as well as most commercially available ink compositions, the drop mass per firing typically ranges from about 100-200 ng (nanograms) with respect to most commercially available cartridge systems (e.g. those referenced herein).

The present invention involves a special additive which is tremendously effective in controlling all of the foregoing problems. This additive consists of a compound selected from a group of materials known conventionally as "polyether polyols." As described in Sections 3.1 and 3.2 of *The Flexible Polyurethane Foam Handbook* by the Dow Chemical Company of Midland, Mich. (incorporated herein by reference), a polyether polyol chemically consists of a poly-functional alcohol which includes a polymeric chain having a plurality of ether (C—O—C) linkages. More specifically, according to *The Flexible Polyurethane Foam Handbook*, supra, a polyether polyol is a "polymeric reaction product of an organic oxide and a compound containing two or more active hydrogen atoms." The hydrogen atom-containing compounds are conventionally known as "initiators."

Organic oxides used to produce polyether polyols typically consist of epoxides (cyclic three-membered rings) examples of which include but are not limited to ethylene oxide, propylene oxide, 1,2-butylene oxide, and epichlorohydrin. Exemplary initiators include but are not limited to water, ethylene glycol, 1,2 propylene glycol, glycerine, trimethylolpropane, ethylene diamine, pentaerythritol, diethylene triamine, sorbitol, and sucrose.

By way of example, a representative polyether polyol may be prepared in accordance with the following reaction:

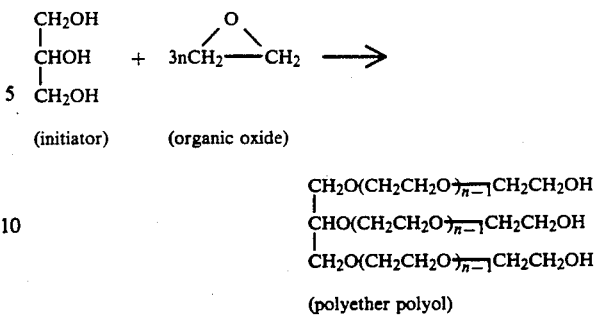

However, a wide variety of polyether polyols may be produced, depending on the type of organic oxide and initiator being used. Thus, the above reaction sequence is only a single, representative example of what type of product can be produced using selected initiators and organic oxides.

Most commercially available polyether polyols are proprietary, and their exact structures are not available to the public. In addition, in view of the significantly complex configurational characteristics of polyether polyols, many if not most commercial products have structures which are literally unknown in terms of exact structural configuration. Thus, polyether polyols are often best defined in terms of their physical characteristics such as average molecular weight, viscosity, number of —OH groups, etc.

A polyether polyol having physical characteristics capable of effectively accomplishing the objectives of the present invention as defined herein is commercially available from the Dow Chemical Company of Midland, Michigan under the trademark VORANOL ® 3010. The structural configuration of this material is not presently known and/or available for the reasons described above. However, this polyether polyol (as well as other polyether polyols) is best represented by the physical characteristics thereof. With respect to VORANOL ® 3010 (a triol), these characteristics are: 1) number of —OH groups=about 56; 2) average molecular weight=about 3000; 3) viscosity=about 225 cks at 100 degrees F; 4) specific gravity=about 1.016; 5) maximum % water=about 0.06; and 6) flash point=-about 221 degrees C.

In a preferred embodiment, the completed ink composition will contain about 0.001-1.0% by weight polyether polyol (about 0.0075%=optimum). The polyether polyol is preferably added to the ink composition in the form of a stock solution having a concentration level of about 10-20% by weight polyether polyol in a solvent preferably consisting of one of the water-soluble organic solvents listed above which are used to produce the ink compositions described herein. These solvents include but are not limited to glycols and glycol ethers (e.g. ethylene glycol, diethylene glycol, triethylene glycol, or 2-methoxy-2-ethoxy-2-ethoxyethanol), polyethylene glycols with molecular weights of up to 500, and heterocyclic ketones (e.g. 2-pyrrolidone, N-methylpyrrolid-2-one or 1,3-dimethylimidazolid-2-one). However, the present invention shall not be limited to the use of any particular stock solution concentration level or type.

The use of polyether polyol is widely applicable to numerous ink formulations/dyes including those listed above and other compositions known in the art. Tests have shown that the addition of polyether polyol to ink compositions of the type described herein typically reduces the surface tension thereof by about 25-30%. Thus, an ink composition having a surface tension of about 65 dynes/cm would consequently have a surface tension of about 45 dynes/cm after polyether polyol addition.

As noted above, various surfactants have been used in the past to control surface tension levels in ink compositions. However, the use of these materials does not result in a corresponding increase in drop mass per firing. In contrast, the desired result occurs when polyether polyol is added. Specifically, the surface tension is lowered and the drop mass per firing is increased, typically by about 10-20%. For example, if a specific ink composition has a drop mass per firing of about 125 ng, this value will increase to about 140 ng after the addition of polyether polyol within the range presented above.

The polyether polyol additive described herein is of substantial value in that it is capable of simultaneously solving three problems, namely, (1) excessively high surface tension levels; (2) low drop mass per firing; and (3) excessive ink bubble adhesion/longevity within the firing chambers of the ink cartridges being used. As a result, higher quality graphic images are formed while avoiding problems associated with ink coalescence and cartridge clogging. In addition, all of these benefits are accomplished using very small amounts of polyether polyol.

Ink compositions using polyether polyol may be delivered using a wide variety of printing systems, including but not limited to thermal inkjet units as described in U.S. Pat. No. 4,500,895 to Buck et al.; U.S. Pat. No. 4,513,298 to Scheu; U.S. Pat. No. 4,794,409 to Cowger, et al.; the Hewlett-Packard Journal, Vol. 36, No. 5 (May 1985); and the Hewlett-Packard Journal, Vol. 39, No. 4 (August 1988). The ink compositions are conventionally supplied to a selected printing system which is then activated in order to deliver the compositions onto a substrate. After being allowed to dry (which occurs rapidly in the case of nearly all commercially available ink compositions), a stable printing image is produced with a high degree of clarity and contrast.

By using polyether polyol as described herein, a balance between proper surface tension values, proper drop mass per firing, and desired cartridge performance is achieved. Specifically, both drop mass per firing and general cartridge performance are improved simultaneously, which has yet to be achieved when other additives are used. Accordingly, the developments described herein represent a tremendous and substantial advance in the art of ink manufacture. In addition, as previously indicated, the polyether polyol additive of the present invention is prospectively usable in a wide variety of ink compositions known in the art. For illustration purposes, Example 2 provided below lists a representative ink formulation comparable to the formulation of Example 1 which incorporates a polyether polyol additive:

EXAMPLE 2

| Component | Wt. % |
|---|---|
| Dye structure #1 (Table 1) | 1.1 |
| Dye structure #4 (Table 1) | 1.1 |
| Solvent (2-pyrrolidone) | 7.5 |
| Buffer | |
| BORAX | 0.2 |

-continued

| Component | Wt. % |
|---|---|
| TRIS | 0.2 |
| Phosphate anion (ammonium phosphate) | 0.07 |
| Chelating agent (EDTA) | 0.1 |
| Biocide (PROXEL ™ GXL) | 0.3 |
| polyether polyol (VORANOL ® 3010) | 0.0075 |
| water | 89.4225 |
| | 100.00 |

This ink composition has a surface tension of about 45 dynes/cm compared with about 65 dynes/cm in the formulation of Example 1 which did not include a polyether polyol additive. In addition, the composition of Example 2 has an average drop mass per firing of about 130-145 ng (when delivered using a conventional thermal inkjet printing system) compared with a drop mass per firing of about 120-125 ng in the formulation of Example 1.

Finally, tests were conducted involving an ink composition having a variety of surfactants and the polyether polyol of the present invention added thereto. The specific ink composition which was used consisted of the components listed in Example 2 except for the substitution of various individual surfactants. In each test, the ink composition contained about 0.0075% by weight surfactant or polyether polyol. Identical thermal inkjet delivery systems were used to deliver the inks (e.g. of the type listed in U.S. Pat. No. 4,794,409 to Cowger et al. without a foam-type reservoir). The test results are as follows:

TABLE II

| Ink additive | surface tension (dyn/cm) | approximate drop mass (ng) |
|---|---|---|
| none | 65.0 | 120 |
| polyethylene glycol | 58.8 | 121 |
| Surfynol 465 ™ | 54.1 | 123 |
| N,N Dimethyldodecyl amine-N-oxide | 38.7 | 125 |
| 3-(N,N Dimethylpalmityl-ammonio)-propanesulfonate | 38.3 | 126 |
| polyether polyol (VORANOL ® 3010) | 45.7 | 132 |

As indicated in Table II, the polyether polyol and surfactants all reduced the surface tension of the ink composition. However, the polyether polyol also provided a substantial increase in drop mass per firing which was not evident with respect to the surfactants. Thus, the data in Table II clearly illustrates the multiple benefits accomplished through the addition of polyether polyol as described above.

Having herein described preferred embodiments of the present invention, it is anticipated that suitable modifications may be made thereto by individuals skilled in the art which remain within the scope of the invention. Thus, the present invention shall only be construed in accordance with the following claims:

The invention that is claimed is:

1. A method for manufacturing a reduced surface tension ink composition having an increased drop mass per firing comprising the steps of:

obtaining a supply of at least one chemical dye; and combining said chemical dye with at least one polyether polyol in order to produce said ink composition, said polyether polyol having physical characteristics sufficient to enable said ink composition to have a reduced surface tension and increased drop mass per firing compared with an ink composition produced in the absence of said polyether polyol.

2. The method of claim 1 wherein said polyether polyol has an average molecular weight of about 3000, about 56 —OH groups, and a viscosity of about 225 cks at 100° F.

3. The method of claim 1 wherein said ink composition comprises about 0.001-1.0% by weight said polyether polyol.

4. The method of claim 1 wherein said ink composition comprises about 0.5-20.0% by weight said chemical dye.

5. A method for manufacturing a reduced surface tension ink composition having an increased drop mass per firing comprising the steps of:
obtaining a supply of at least one chemical dye; and
combining said chemical dye with at least one polyether polyol in order to produce said ink composition, said composition comprising about 0.001-1.0% by weight said polyether polyol, and about 0.5-20.0% by weight said chemical dye, said polyether polyol having physical characteristics sufficient to enable said ink composition to have a reduced surface tension and increased drop mass per firing compared with an ink composition produced in the absence of said polyether polyol, said polyether polyol having an average molecular weight of about 3000, about 56 —OH groups, and a viscosity of about 225 cks at 100° F.

6. An ink composition having a reduced surface tension and an increased drop mass per firing comprising:
at least one chemical dye; and
at least one polyether polyol combined with said chemical dye in order to produce said ink composition, said polyether polyol having physical characteristics sufficient to enable said ink composition to have a reduced surface tension and increased drop mass per firing compared with an ink composition produced in the absence of said polyether polyol.

7. The composition of claim 6 wherein said polyether polyol has an average molecular weight of about 3000, about 56 —OH groups, and a viscosity of about 225 cks at 100° F.

8. The composition of claim 6 wherein said composition comprises about 0.001-1.0% by weight said polyether polyol.

9. The composition of claim 6 wherein said composition comprises about 0.5-20.0% by weight said chemical dye.

10. An ink composition having a reduced surface tension and an increased drop mass per firing comprising:
at least one chemical dye; and
at least one polyether polyol combined with said chemical dye in order to form said composition, said composition comprising about 0.001-1.0% by weight said polyether polyol and about 0.5-20.0% by weight said chemical dye, said polyether polyol having physical characteristics sufficient to enable said ink composition to have a reduced surface tension and increased drop mass per firing compared with an ink composition produced in the absence of said polyether polyol, said polyether polyol having an average molecular weight of about 3000, about 56 —OH groups, and a viscosity of about 225 cks at 100° F.

11. A method for printing a stable image onto a substrate comprising the steps of:
providing an ink composition having a reduced surface tension and an increased drop mass per firing, said ink composition comprising at least one chemical dye and at least one polyether polyol combined with said chemical dye, said polyether polyol having physical characteristics sufficient to enable said ink composition to have a reduced surface tension and increased drop mass per firing compared with an ink composition produced in the absence of said polyether polyol;
providing a printing apparatus;
supplying said printing apparatus with said ink composition;
activating said printing apparatus in order to cause said apparatus to apply said ink composition onto said substrate; and
allowing said ink composition on said substrate to dry in order to produce said image thereon.

12. The method of claim 11 wherein said polyether polyol has an average molecular weight of about 3000, about 56 —OH groups, and a viscosity of about 225 cks at 100° F.

13. The method of claim 11 wherein said printing apparatus comprises a thermal inkjet printing system.

14. The method of claim 11 wherein said composition comprises about 0.001-1.0% by weight said polyether polyol.

15. The method of claim 11 wherein said ink composition comprises about 0.5-20.0% by weight said chemical dye.

16. A method for printing a stable image onto a substrate comprising the steps of:
providing an ink composition having a reduced surface tension and an increased drop mass per firing, said ink composition comprising about 0.5-20.0% by weight of at least one chemical dye and about 0.001-1.0% by weight of at least one polyether polyol, said polyether polyol having physical characteristics sufficient to enable said ink composition to have a reduced surface tension and increased drop mass per firing compared with an ink composition produced in the absence of said polyether polyol, said polyether polyol having an average molecular weight of about 3000, about 56 —OH groups, and a viscosity of about 225 cks at 100° F.;
providing a printing apparatus;
supplying said printing apparatus with said ink composition;
activating said printing apparatus in order to cause said apparatus to apply said ink composition onto said substrate; and
allowing said ink composition on said substrate to dry in order to produce said image thereon.

17. The method of claim 16 wherein said printing apparatus comprises a thermal inkjet printing system.

* * * * *